April 3, 1945.   W. A. RAY   2,372,853
ELECTROMAGNETICALLY OPERATED VALVE
Filed Jan. 18, 1943
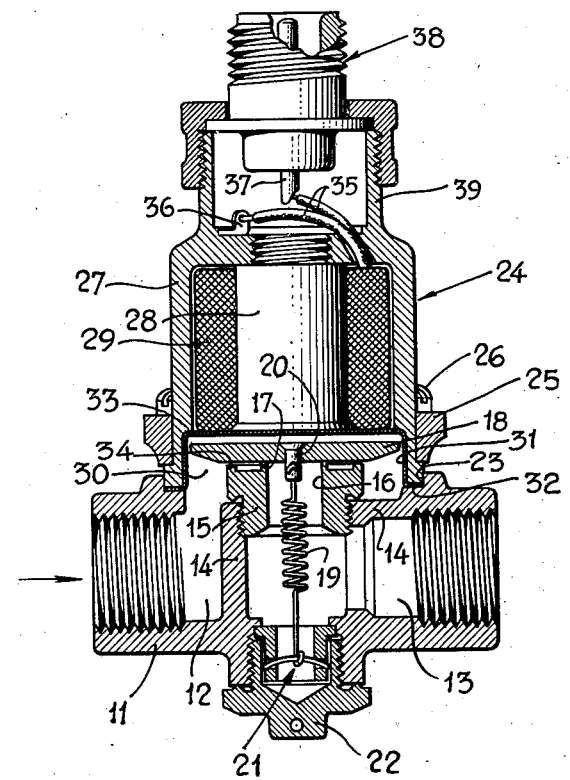
WILLIAM A. RAY,
Inventor;
By John H. Rouse,
Attorney.

Patented Apr. 3, 1945

2,372,853

UNITED STATES PATENT OFFICE 2,372,853

ELECTROMAGNETICALLY OPERATED VALVE

William A. Ray, Los Angeles, Calif.

Application January 18, 1943, Serial No. 472,685

2 Claims. (Cl. 137—139)

My present invention relates to fluid control valves, and particularly to those of the electromagnetically operated type.

An object of the invention is to provide a valve having a closure member, at least a portion of which is slidable within the housing or outer core of an electromagnet covering an opening through the casing of the valve.

A more specific object is to provide a valve having a disk-like closure member of magnetic material, and an electromagnetic operator therefor which is mounted so as to cover an opening through the casing of the valve, the core of the electromagnetic operator being so arranged as to provide a space wherein the disk-like closure member can slide in operation.

Another object is to provide a non-magnetic liner for the closure member space referred to in the preceding object.

Another object is to so arrange the valve seat of a fluid control valve that it projects outside of the casing of the valve through an opening formed in a wall thereof.

Other objects and advantages of the invention will be found in the description, the drawing, and in the claims; and for full understanding of the invention, reference may be had to the following detailed description and accompanying drawing, the single figure of which is a sectional view of an electromagnetically-operated fluid control valve embodying my invention.

In the drawing, the numeral 11 indicates a valve casing having an inlet 12 and an outlet 13 separated by a partition 14. Threaded in an opening through the horizontal portion of the partition, and extending outside of the casing through an opening formed in the top wall thereof, is a valve port member 15 which provides at its top surface, surrounding the port opening 16, an annular valve seat 17 of uniform wall thickness. Cooperable with the seat 17 is a disk-like closure member 18, of magnetic material, which is normally held in seating position by the force of a bias spring 19 tensioned between a pin 20 pressed in a central opening through the closure member and a fitting 21 provided in an opening (covered by a cap 22) through the bottom wall of the casing.

Closing the opening through the top wall of the casing through which the valve-port and -seat member 15 extends, and fitting in a shallow enlargement 23 of that opening, is an electromagnet, generally indicated at 24, which is clamped in position by a ring 25 secured with respect to the casing by screws 26. The electromagnet 24 comprises an inverted cup-shaped outer core 27 and a concentric cylindrical inner core 28 threadedly joined to the top wall of the outer core. The inner core is of such diameter that there is an annular recess between it and the outer core, and within that recess and encircling the inner core is an energizing coil winding 29. The inner core is shorter than the outer core so that its bottom end terminates in a plane above that of the open end of the outer core to form a space 30 for the closure member 18 to slide in. Lining the space 30 is an inverted cup-shaped member 31, of thin non-magnetic material such as brass, which serves both to avert the possibility of magnetic "sticking" of the armature-closure-member 18 by preventing direct engagement thereof with the cores 28 and 27; and also to shield the interior of the electromagnet from the fluid controlled by the valve, the member 31 being provided for that purpose with a flange 32 which is interposed between the abutting surfaces of the outer core and the casing.

The bottom surface of the inner core 28 forms a pole face spaced but a short distance above the armature-closure-member 18, and toward which pole face that member is attracted when the cores are energized by passage of current through the coil winding 29. The periphery of member 18 is in good flux-transfer relation to the portion of the outer core 27 which extends around it, and the only actual working gap in the magnetic circuit is that between the inner core and the member 18; however, attraction of the member 18 is also influenced by the narrow pole face, indicated at 33, provided in the outer core by enlargement of the internal diameter of the portion of the outer core which surrounds the space 30.

For limiting the tilt of the closure member 18, in its movements, to an angle so small that uneven wear of the seat 17 is prevented, there is provided a ring 34 which extends from the top surface of the port member 15 almost to the plane of the seat 17—this feature being the subject of my copending application, Serial No. 418,707, filed November 12, 1941. The coil leads 35 extend through an opening in the top wall of the outer core, one of them being grounded to the core at 36 and the other being connected to the insulated terminal 37 of a conventional cable-connector 38 mounted on a hollow extension 39 of the outer core.

By arranging the seat of the valve so that it extends outside of the casing, final machining and lapping of the seat after assembly (to accurately adjust the lift of the closure member and to ensure leakproof seating thereof) is greatly facilitated. Also, such arrangement of the valve seat simplifies the construction of the electromagnet necessary to permit reception of the closure member within the mouth of its outer core, in which position of the closure member the reluctance of the magnetic circuit is reduced and the operation of the valve improved.

While I have herein shown and described a specific embodiment of my invention, I wish it to be understood that modifications may be made without departing from the spirit of the invention, and that I intend therefore to be limited only by the scope of the appended claims.

I claim as my invention:

1. In an electromagnetically-operated fluid control valve: a casing having a passage therethrough provided with a valve seat, there being an opening through a wall of the casing opposite said seat; an electromagnet comprising a cup-shaped outer core portion so mounted on the casing that its open end joins said casing wall at said opening, and an inner core portion joined to the end wall of the outer portion to provide an annular recess between the core portions; the free end surface of the inner core portion being in a plane parallel to and spaced inwardly from the plane of the open end of the outer core portion so that a space is provided between said planes; a disk-like closure member of magnetic material cooperable with said valve seat and reciprocable in said space; a coil winding in said recess for energizing said core portions so as to cause attraction of said closure member toward said free end surface of said inner core portion; and a cup-shaped member of thin non-magnetic material lining said space and serving to prevent direct engagement of the closure member with the core portions and also to shield the interior of the electromagnet from the fluid controlled by the valve.

2. In an electromagnetically-operated fluid control valve: a casing having a passage therethrough provided with a valve seat, there being an opening through a wall of the casing opposite said seat; an electromagnet comprising a cup-shaped outer core portion so mounted on the casing that its open end joins said casing wall at said opening, and an inner core portion joined to the end wall of the outer portion to provide an annular recess between the core portions; the free end surfaces of the inner core portion being in a plane parallel to and spaced inwardly from the plane of the open end of the outer core portion so that a space is provided between said planes; the inner transverse dimensions of the outer core portion being increased between said planes so that the outer core portion forms a shoulder in the plane of the free end surface of the inner core portion; a disk-like closure member of magnetic material cooperable with said valve seat and reciprocable in said space; a cup-shaped member of thin non-magnetic material lining said space and serving to prevent direct engagement of the closure member with the core portions and also to shield the interior of the electromagnet from the fluid controlled by the valve; and a coil winding in said recess for energizing said core portions so as to cause attraction of said closure member toward the plane of said free end surface of said inner core portion and of said shoulder, the size of said closure member being such that its edge extends close to the outer core portion and its marginal portion is adjacent said shoulder when in attracted position.

WILLIAM A. RAY.